United States Patent [19]

Edwards

[11] Patent Number: 4,786,690

[45] Date of Patent: Nov. 22, 1988

[54] PROCESS FOR POLYMER PRODUCTION

[75] Inventor: Douglas C. Edwards, Sarnia, Canada

[73] Assignee: Polysar Limited, Sarnia, Canada

[21] Appl. No.: 62,594

[22] Filed: Jun. 16, 1987

Related U.S. Application Data

[63] Continuation-in-part of Ser. No. 534,763, Sep. 22, 1983, abandoned.

[30] Foreign Application Priority Data

Nov. 10, 1982 [CA] Canada ................................ 415,313

[51] Int. Cl.$^4$ .................... C08F 114/16; C08F 136/01
[52] U.S. Cl. ............................ 525/330.7; 525/330.8;
525/301.1; 525/333.1; 525/333.2; 525/329.1;
525/329.3; 525/345; 525/388; 525/327.9;
526/290; 526/291; 526/295; 526/331.4
[58] Field of Search ................ 525/330.7, 330.8, 331.9,
525/331.1, 333.2, 329.1, 329.3, 345, 388, 331.4,
327.9; 526/290, 291, 295

[56] References Cited

U.S. PATENT DOCUMENTS

| | | | |
|---|---|---|---|
| 3,238,187 | 3/1966 | Kraus et al. | 525/388 |
| 3,392,154 | 7/1968 | Baldwin | 525/123 |

FOREIGN PATENT DOCUMENTS 884448 12/1961 United Kingdom .

OTHER PUBLICATIONS

Billmeyer, Jr., "Textbook of Polymer Science", pp. 141 & 372.

Primary Examiner—Kriellion Morgan
Attorney, Agent, or Firm—Stevens, Davis, Miller & Mosher

[57] ABSTRACT

A process is provided for the production of a polymer of reduced molecular weight by subjecting, in bulk form, a halogenated butyl polymer having at least 75 percent of the unsaturation in the EXO methylene configuration to mastication in an extruder while exposing the masticated polymer to an atmosphere containing ozone. Such reduced molecular weight polymers have an $M_n$ of from about 10,000 to about 40,000 and may be used in caulks and sealants.

13 Claims, No Drawings

PROCESS FOR POLYMER PRODUCTION

This is a continuation-in-part of application Ser. No. 534,763 filed Sept. 22, 1983, now abandoned.

FIELD OF THE INVENTION

This invention is directed to a process for producing a low molecular weight polymer, wherein halogenated butyl polymer is subjected to mastication in an extruder while being exposed to an atmosphere containing ozone to produce a polymer having a lower molecular weight than the starting halogenated butyl polymer.

BACKGROUND OF THE INVENTION

This invention relates to a process for producing a polymer of reduced molecular weight. Specifically, the invention relates to a process for producing a halogenated butyl rubber of reduced molecular weight.

The manufacture of butyl rubber by copolymerization of isobutylene with a small amount of isoprene at temperatures below $-40°$ C., usually below $-80°$ C., is well known in the art—see for example, U.S. Pat. No. 2,399,672. Halogenated butyl polymers have been known and commercially available for many years, and are prepared by halogenating butyl rubber. During the halogenation process, the isoprene units of the butyl rubber (I) react with the halogen ($X_2$) to yield halogen-substituted units (II) and hydrogen halide as a by-product:

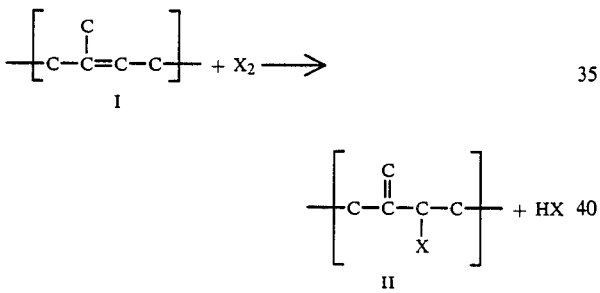

Structure II, which is hereinafter referred to as the "EXO methylene configuration", is believed to be the predominant configuration of the halogen-substituted units in both commercial brominated and chlorinated butyl rubbers made by a solution process—see for example the Vanderbilt Rubber Handbook, by R. O. Babbit (R. T. Vanderbilt Company, Inc.); pages 102 and 133.

Certain polymers may be treated with ozone containing gas to produce polymers of lower molecular weight, such reactions being undertaken with the polymer in solution in a solvent—see for example, British Patent No. 984,071 and U.S. Pat. No. 3,392,154. It is also well known in the art that rubbery vulcanizates will crack when exposed to an atmosphere containing ozone but only when the rubbery vulcanizate is subjected to a strain such as by elongation. British Patent No. 883,791 teaches that a process for making graft-type polymers is to introduce oxygenated groups into the base polymer following which a polymerizable monomer is added and the oxygenated groups are decomposed to cause polymerization and grafting of the monomer onto the base polymer. One illustration of such a process is to masticate a polymer in the presence of ozone following which monomer is mixed with the ozonized polymer and the mixture is heated to cause grafting of the monomer onto the original polymer.

British Patent No. 884,448 teaches a two-step process for improving the physical properties of a large variety of polymers. Specifically, the process comprises (i) contacting apolymer with ozone at a temperature less than 130° C. and (ii) subjecting the ozonized polymer to a heat treatment in an oxygen-free environment at a temperature of from about 20° to about 250° C. The products of this process are claimed to possess improvements in tensile strength, tear resistance, abrasion resistance and a variety of other physical properties.

SUMMARY OF THE INVENTION

It is an objective of the present invention to provide a process for the production of a polymer having a reduced molecular weight.

Further, it is an objective of the present invention to provide a process for the production of halogenated butyl polymer having a number-average molecular weight ($M_n$) of less than about 40,000.

Accordingly, there is provided a continuous process for producing a polymer of reduced molecular weight which comprises subjecting a halogenated butyl polymer selected from chlorinated butyl rubber and brominated butyl rubber and having an $M_n$ of from about 85,000 to about 150,000 to mastication in an extruder at a temperature of from about 140° to about 200° C. while being exposed to and in contact with an atmosphere containing from about 0.1 to about 4 volume per cent of ozone for a time sufficient to produce a reduced molecular weight polymer wherein the halogenated butyl polymer contains at least about 75 percent of the unsaturation in the EXO methylene configuration, said extruder is selected from twin screw and single screw extruders, said mastication is characterized by a shear rate of from about 575 to about 1900 $sec^{-1}$, and said reduced molecular weight polymer has an $M_n$ of from about 10,000 to about 40,000.

DETAILED DESCRIPTION OF THE INVENTION

The polymers suitable for use in the present invention are halogenated butyl polymers, which are well known in the art and may be selected from chlorinated and brominated butyl rubber; they are produced by chlorination or bromination of butyl rubber. Chlorinated butyl rubber typically contains from about 1 to about 3, preferably from about 1 to about 2, weight percent of isoprene and from about 97 to about 99, preferably from about 98 to about 99, weight percent of isobutylene, based on the hydrocarbon content of the polymer, and from about 0.5 to about 2.5, preferably from about 0.75 to about 1.75, weight percent of chlorine based on the chlorinated butyl rubber. A typical chlorinated butyl rubber has a molecular weight, expressed as the Mooney viscosity (ML 1+8 at 125° C.), of from about 35 to about 55 or expressed as the number-average molecular weight ($M_n$), of from about 85,000 to about 150,000; and at least about 75 percent, preferably at least about 90 percent, of the unsaturation in the EXO methylene configuration described above. Brominated butyl rubber typically contains from about 1 to about 3, preferably from about 1 to about 2, weight percent of isoprene and from about 97 to about 99, preferably from about 98 to about 99, weight percent of isobutylene, based on the hydrocarbon content of the polymer, and from about 1 to about 4, preferably from about 1.5 to about 3, weight percent of bromine, based on the brominated butyl rubber. A typical brominated butyl rubber has a molecular weight, expressed as the Mooney viscosity (ML 1+8 at 125° C.), of from about 25 to about 55 or expressed as $M_n$, of from about 85,000 to about 150,000; and at least about 75 percent, preferably at least about 85 percent, of the unsaturation in the EXO methylen configuration described above.

In the continuous process of the present invention the mastication of the polymer is an essential feature. The mastication leads to the continuous formation of new surfaces of the bulk polymer under conditions of strain. Accordingly, a suitable device for practicing the present invention is an extruder. During the operation of the extruder, the polymer is sheared and thereby is under strain such that new polymer surfaces are being continuously formed for reaction with the ozone containing atmosphere. Extruders may be used which have single or twin extruder screws, with twin screws being preferred, to cause shearing of the polymer and may be equipped with mixing and shearing components along the length of the extruder screw. Such extruders are equipped with one or more means to feed into the polymer in the extruder the atmosphere containing ozone so that the ozone is mixed with the polymer and is available for reaction with the polymer at the freshly formed strained surfaces as a result of the shearing of the polymer within the extruder.

The mastication of the polymer within the extruder may be characterized by the shear rate, which gives an indication of the amount of shear that the polymer is subjected to, wherein the shear rate is defined as the velocity of the extruder screw tip divided by the clearance between the extruder screw tip and barrel. In the present invention, the extruder must be operated in a manner whereby a shear rate of from about 575 to about 1900 sec$^{-1}$, preferably from about 750 to about 1900 sec$^{-1}$ and most preferably from about 1000 to about 1900 sec$^{-1}$, is achieved. Further, mastication of the polymer within the extruder may also be characterized by the mechanical energy that the polymer is subjected to, wherein mechanical energy is defined as drive voltage multiplied by drive current divided by polymer feed rate. In the present invention, the mechanical energy is from about 1.1 to about 4.3 MJ/kg polymer.

It is necessary that the masticated polymer be exposed to and in contact with an atmosphere containing ozone. The design of an extruder suitable for use in the present invention can be readily achieved by one of ordinary skill in the art: commercially available extruders are known in which the configuration of the screw or screws is varied along the length of the screw to provide both feeding and shearing sections, wherein said feeding section is located at the inlet of the extruder and serves to transport the polymer into the extruder and said shearing sections are located after said feeding section such that said shearing sections serve to knead and masticate the polymer in the presence of the ozone containing atmosphere. Suitable L/D ratios for the screw can readily be determined—a preeerred L/D ratio is not less than 10 and preferably not less than 20. Preferably, such an extruder will be equipped with suitable vent ports to remove any unreacted ozone and the atmosphere which had contained the ozone. Most preferably, the extruder will be equipped with a devolatilizing section, preferably a vacuum devolatilizing section, at a terminal section of the extruder in order to readily remove any volatile materials existing in the polymer. An atmosphere containing ozone may suitably be ozone in a stream of oxygen or air and suitable means for generating ozone in a stream of oxygen or air are well known and usually operate by an electric discharge through the oxygen or air. For safety reasons, the atmosphere containing ozone is preferably ozone in a stream of air, wherein concentrations of ozone in said stream are from about 0.1 to about 4 volume percent, preferably from about 0.3 to about 2 volume percent. In carrying out the present process the contact time between the polymer and the ozone containing atmosphere is not critical. However, in order to maximize the overall efficiency of the continuous process of this invention, the contact time between the polymer and the ozone containing atmosphere is preferably from about 10 to about 60 seconds, more preferably from about 15 to about 45 seconds and most preferably from about 20 to about 35 seconds. The temperature of the atmosphere containing ozone as supplied to the extruder is suitably from about 15° to about 40° C. The temperature of the polymer during reaction with the ozone containing atmosphere is from about 140° to about 200° C., preferably from about 140° to about 190° C. and most preferably from about 150° to about 180° C. If the reaction temperature exceeds 200° C. there is the possibility that thermal degradation of the polymer would occur—this prohibits effective molecular weight control of the product. Further, at such elevated temperatures the product becomes severely discoloured. If the reaction temperature is below 140° C., the process suffers from being relatively inefficient.

The product of the present process is, surprisingly and without scientific explanation, a polymer of lower molecular weight than the starting halogenated butyl rubber. Thus, a low molecular weight polymer is produced from a polymer having at least 75 percent of the unsaturation adjacent to, but not incorporated in, the main chain of the polymer. This result is both surprising and unexpected because simple scission of the double bonds in the polymer would not lead to any significant fragmentation of the main chain. In other words, scission of the double bond in the predominent EXO methylene configuration of the halogenated butyl polymers would not be expected to lead to the low molecular weight polymers of the present invention. The fluidity of the products of the present process may vary over a wide range and will generally be below the fluidity or viscosity of conventional solid polymers normally encountered in the rubber industry. Preferably, the product of the present process has an $M_n$ of from about 10,000 to about 40,000. Generally, the product of the present process has an $M_n$ of not more than about 40 percent and preferably not more than about 30 percent of the $M_n$ of the starting halogenated polymer.

The product of the present process may be used in applications where polymers of low molecular weight may be used. Such applications include use in caulks and sealants, as rubber processing aid additives, as asphalt additives and the like.

The following examples illustrate the scope of the invention and are not intended to limit such scope.

EXAMPLE 1

A sample of brominated butyl rubber—a commercial product sold as POLYSAR® Bromobutyl 2030, having a bromine content of about 1.9 weight percent and a Mooney viscosity (ML 1+8 at 125° C.) of about 32—was subjected to a grinding operation to provide small particles of polymer. An extruder equipped with 3.4 cm co-rotating twin screws, having a total length of about 119 cm, and having an L/D of about 35 and having a hopper for supply of polymer at one end and a slit die attached to the outlet and heating and cooling means along the length of the extruder, was equipped with a gas inlet means at about 35 cm from the inlet. Each screw in the extruder had a combination of feeding and shearing sections along the length of the screw. An ozone generator capable of supplying up to about 0.1 pounds per hour of ozone in air was connected to the gas inlet means of the extruder and provided a stream containing up to about 2 volume percent of ozone in air. A number of samples of the ground brominated butyl rubber described above were fed into the hopper at the inlet of the extruder. Table I provides the analytical data obtained for polymer from the outlet of the extruder under the operating conditions shown. Molecular weight data was obtained by gel permeation chromatographic analysis. EXO methylene content was obtained by Fourier Transform Nuclear Magnetic Resonance (FT-NMR) spectroscopic analysis—this value indicates the mole percentage of the unsaturation which is present as the EXO methylene configuration. Halogen content was obtained by flame oxidation of the low molecular weight polymer followed by titration with silver nitrate. Control 1 is representative of the starting brominated butyl rubber. In Control 2, the brominated butyl rubber was subjected to the shearing action of the extruder in the absence of air or ozone—these conditions did not cause thermal degradation of the starting polymer. In Control 3, the brominated butyl rubber was subjected to the shearing action of the extruder in the presence of air and the absence of ozone—these conditions did not cause oxidative degradation of the starting polymer. Accordingly, Controls 1, 2 and 3 are outside the scope of the present invention. In Experiments 1 and 2, which are within the scope of the present invention, the brominated butyl rubber was subjected to the shearing action of the extruder in the presence of an ozone containing atmosphere—these conditions caused a marked reduction in the molecular weight of the starting polymer. The products obtained from Experiments 1 and 2 were viscous, fluid polymers as they exited the extruder at elevated temperatures; upon cooling to room temperature, the products were semi-solid and sticky. Further, a comparision of the molecular weight data obtained from the products of Experiments 1 and 2 indicates that using elevated ozone feed rates does not significantly further reduce the molecular weight of the polymer. Still further, a comparison of the halogen content level for the Controls and Experiments in Table I indicates that the majority of the halogen is still present in the polymeric product. Still further, a comparison of the EXO methylene content for the Controls and Experiments in Table I indicates that the majority of the unsaturation in the product polymers is still present as the EXO methylene configuration.

TABLE I

| | Experiment # | | | | |
|---|---|---|---|---|---|
| | Control 1 | Control 2 | Control 3 | 1 | 2 |
| Extruder Conditions | | | | | |
| Temperature (°C.) | — | 150 | 150 | 150 | 150 |
| rpm | — | 130 | 130 | 130 | 130 |
| Shear rate (sec$^{-1}$) | — | 757 | 757 | 757 | 757 |
| Mechanical energy (MJ/kg polymer) | — | 2.0 | 1.9 | 1.7 | 1.6 |
| Polymer feed rate (lb/hr) | — | 8 | 8 | 8 | 8 |
| Ozone feed rate (lb/hr) | — | — | 0 | 0.042 | 0.084 |
| Molecular Weight Data | | | | | |
| $M_n \times 10^{-3}$ | 117 | 117 | 116 | 25 | 22 |
| $M_w \times 10^{-3}$ | 390 | 380 | 378 | 205 | 196 |
| Halogen content (wt. %) | 1.9 | ca1.7 | 1.7 | 1.7 | 1.6 |
| EXO methylene content (mole %) | 91 | 85 | ca78 | — | ca64 |

EXAMPLE 2

Using the same equipment as in Example 1, the same brominated butyl rubber and the same extruder, and the same procedure, the experiment shown in Table II, which are within the scope of the present invention, yielded reduced molecular weight polymers having the molecular weight data shown. The results clearly show that the molecular weight of the polymer can be markedly reduced in comparison to that of the original polymer (Control 1 of Example 1), to that of the polymer subjected to the shearing action of the extruder without air or ozone (Control 2 of Example 1) and to that of the polymer subjected to the shearing action of the extruder in the presence of air and the absence of ozone (Control 3 of Example 1). Furthermore, as the shear rate in the extruder increases, the molecular weight—both $M_n$ and $M_w$—of the product polymer decreases. However if the ozone containing atmosphere is absent and the shear rate is increased, reduction in molecular weight of the starting polymer will not be achieved—thus a high shear rate alone will not lead to the object of the present invention being achieved.

TABLE II

| | Experiment # | | |
|---|---|---|---|
| | 3 | 4 | 5 |
| Extruder Conditions | | | |
| Temperature (°C.) | 150 | 150 | 150 |
| rpm | 130 | 200 | 300 |
| Shear rate (sec$^{-1}$) | 757 | 1165 | 1748 |
| Mechanical energy (MJ/kg polymer) | 1.3 | 1.7 | 2.4 |
| Polymer feed rate (lb/hr) | 11 | 13 | 12 |
| Ozone feed rate (lb/hr) | 0.084 | 0.084 | 0.084 |
| Molecular Weight Data | | | |
| $M_n \times 10^{-3}$ | 37 | 31 | 26 |
| $M_w \times 10^{-3}$ | 312 | 264 | 188 |
| Halogen content (wt. %) | 1.8 | 1.8 | 1.8 |
| EXO methylene content (mole %) | 79 | 72 | 59 |

EXAMPLE 3

Using the same extruder and procedure as described in Example 1, a series of similar experiments, shown in Table III, was conducted using a sample of chlorinated butyl—a commercial product sold as POLYSAR® Chlorobutyl 1240, having a chlorine content of about 1.3 weight percent and a Mooney viscosity (ML 1+8 at 125° C.) of about 38—which was previously subjected to a grinding operation to provide small particles of polymer. Controls 4, 5 and 6 which are outside the scope of the present invention, were conducted under reaction conditions similar to those of Controls 1, 2 and 3, respectively. In Experiments 6 and 7, which are within the scope of the present invention, the chlorinated butyl rubber was subjected to the shearing action of the extruder in the presence of an ozone containing atmosphere—these results indicate that a marked reduction in the molecular weight of the starting polymer has been achieved.

TABLE III

|  | Experiment # | | | | |
| --- | --- | --- | --- | --- | --- |
|  | Control 4 | Control 5 | Control 6 | 6 | 7 |
| Extruder Conditions | | | | | |
| Temperature (°C.) | — | 150 | 150 | 150 | 150 |
| rpm | — | 100 | 100 | 100 | 100 |
| Shear rate (sec$^{-1}$) | — | 582 | 582 | 582 | 582 |
| Mechanical energy (MJ/kg polymer) | — | 1.4 | 2.1 | 1.9 | 1.7 |
| Polymer feed rate (lb/hr) | — | 11 | 5.5 | 5.5 | 5.5 |
| Ozone feed rate (lb/hr) | — | — | 0 | 0.042 | 0.084 |
| Molecular Weight Data | | | | | |
| $M_n \times 10^{-3}$ | 127 | 126 | 96 | 26 | 26 |
| $M_w \times 10^{-3}$ | 437 | 501 | 461 | 169 | 203 |
| Halogen content (wt. %) | 1.1 | 0.9 | 1.1 | 1.0 | 0.9 |
| EXO methylene content (mole %) | >95 | >95 | >95 | >95 | >95 |

EXAMPLE 4

Using the same equipment as in Example 3, the same chlorinated butyl rubber and the same extruder, and the same procedure, the experiments shown in Table IV, which are within the scope of the present invention, yielded reduced molecular weight polymers having the molecular weight data shown. Furthermore, when the shear rate in the extruder is maximized, the molecular weight—both $M_n$ and $M_w$—of the product polymer is reduced.

TABLE IV

|  | Experiment # | | |
| --- | --- | --- | --- |
|  | 7 (From Example 3) | 8 | 9 |
| Extruder Conditions | | | |
| Temperature (°C.) | 150 | 150 | 150 |
| rpm | 100 | 200 | 300 |
| Shear rate (sec$^{-1}$) | 582 | 1165 | 1748 |
| Mechanical energy (MJ/kg polymer) | 1.7 | 3.0 | 4.0 |
| Polymer feed rate (lb/hr) | 5.5 | 6.2 | 6.2 |
| Ozone feed rate (lb/hr) | 0.084 | 0.084 | 0.084 |
| Molecular Weight Data | | | |
| $M_n \times 10^{-3}$ | 26 | 29 | 22 |
| $M_w \times 10^{-3}$ | 203 | 196 | 144 |
| Halogen content (wt. %) | 0.9 | 0.9 | 0.9 |
| EXO methylene content (mole %) | >95 | >95 | — |

What is claimed is:

1. A continuous process for producing a polymer of reduced molecular weight which comprises subjecting a halogenated butyl polymer selected from chlorinated butyl rubber and brominated butyl rubber and having a number average molecular weight ($M_n$) of from about 85,000 to about 150,000 to mastication in an extruder at a temperature of from about 140° to about 200° C. while being exposed to and in contact with an atmosphere containing from about 0.1 to about 4 volume per cent of ozone for a time sufficient to produce a reduced molecular weight polymer wherein the halogenated butyl polymer contains at least about 75 percent of the unsaturation in the EXO methylene configuration, said extruder is selected from twin screw and single screw extruders, said mastication is characterized by a shear rate of at least about 575 to about 1900 sec$^{-1}$, and said reduced molecular weight polymer has an $M_n$ of from about 10,000 to about 40,000.

2. The process of claim 1 wherein said extruder is a twin screw extruder and has mixing and shearing components along the length of each extruder screw.

3. The process of claim 2 wherein said halogenated butyl polymer is subjected to a mechanical energy of from about 1.1 to about 4.3 MJ/kg polymer.

4. The process of claim 1 wherein the temperature of the atmosphere containing ozone as supplied to the extruder is from about 15° to about 40° C.

5. The process of claim 4 wherein the temperature of the polymer is from about 140° to about 190° C. and the extruder has an L/D ratio of not less than 10.

6. The process of claim 4 wherein the temperature of the polymer is from about 150° to about 180° C. and the extruder has an L/D ratio of not less than 20.

7. The process of claim 6 wherein the atmosphere containing ozone comprises ozone in air.

8. The process of claim 4 wherein the contact time between said atmosphere containing ozone and said halogenated butyl polymer is from about 10 to about 60 seconds.

9. The process of claim 7 wherein the contact time between said atmosphere containing ozone and said halogenated butyl polymer is from about 15 to about 45 seconds.

10. The process of claim 1 wherein the halogenated butyl polymer is brominated butyl rubber comprising from about 1 to about 3 weight percent of isoprene and from about 97 to about 99 weight percent of isobutylene, based on the hydrocarbon content of the polymer, and from about 1 to about 4 weight percent of bromine, based on said brominated butyl rubber.

11. The process of claim 10 wherein said brominated butyl rubber has at least about 85 percent of the unsaturation in the EXO methylene configuration.

12. The process of claim 1 wherein the halogenated butyl polymer is chlorinated butyl rubber comprising from about 1 to about 3 weight percent of isoprene and from about 97 to about 99 weight percent of isobutylene, based on the hydrocarbon content of the polymer, and from about 0.5 to about 2.5 weight percent of chlorine, based on said chlorinated butyl rubber.

13. The process of claim 12 wherein said chlorinated butyl rubber has at least about 90 percent of the unsaturation in the EXO methylene configuration.

* * * * *